United States Patent Office 3,086,556
Patented Apr. 23, 1963

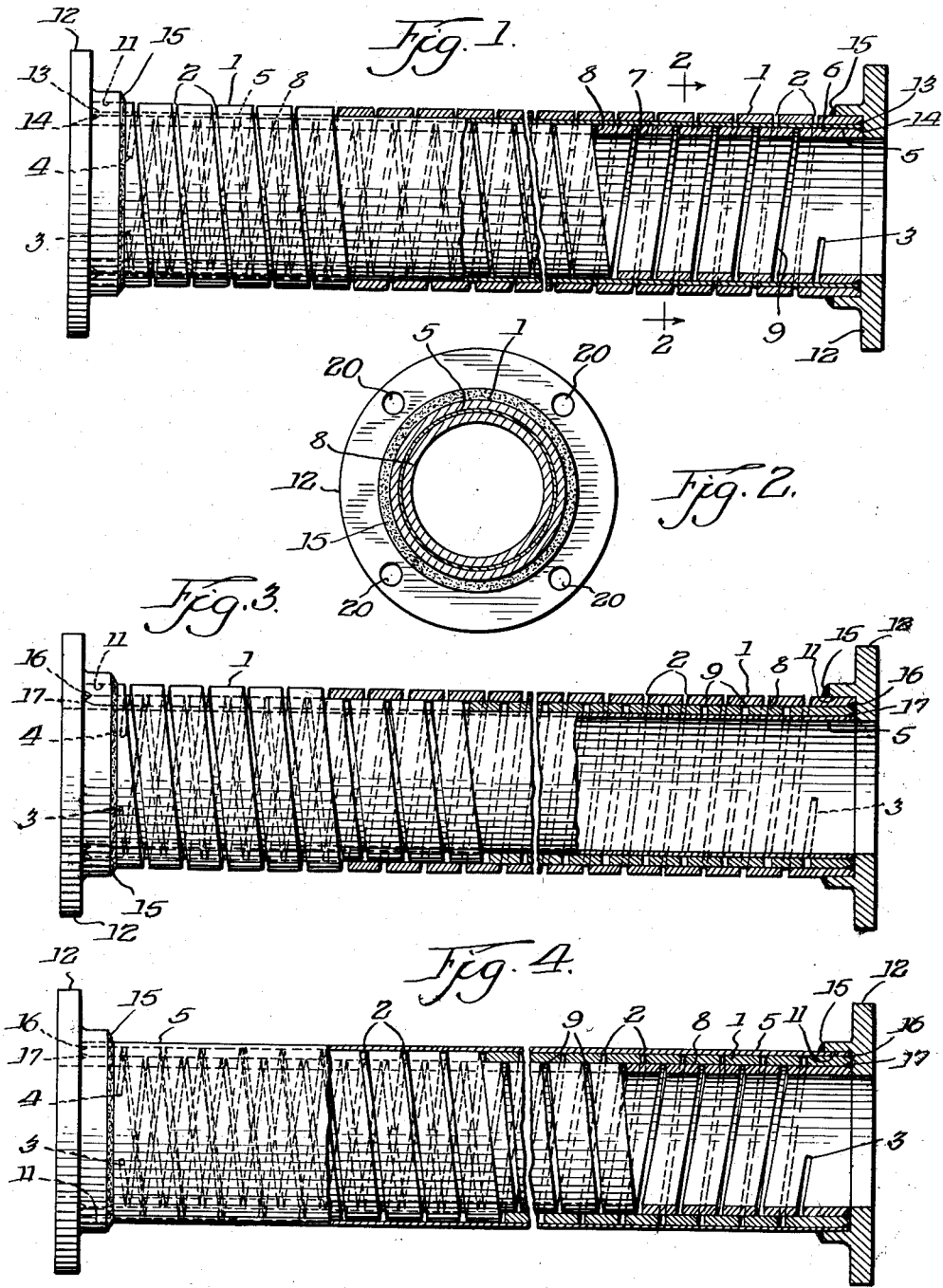

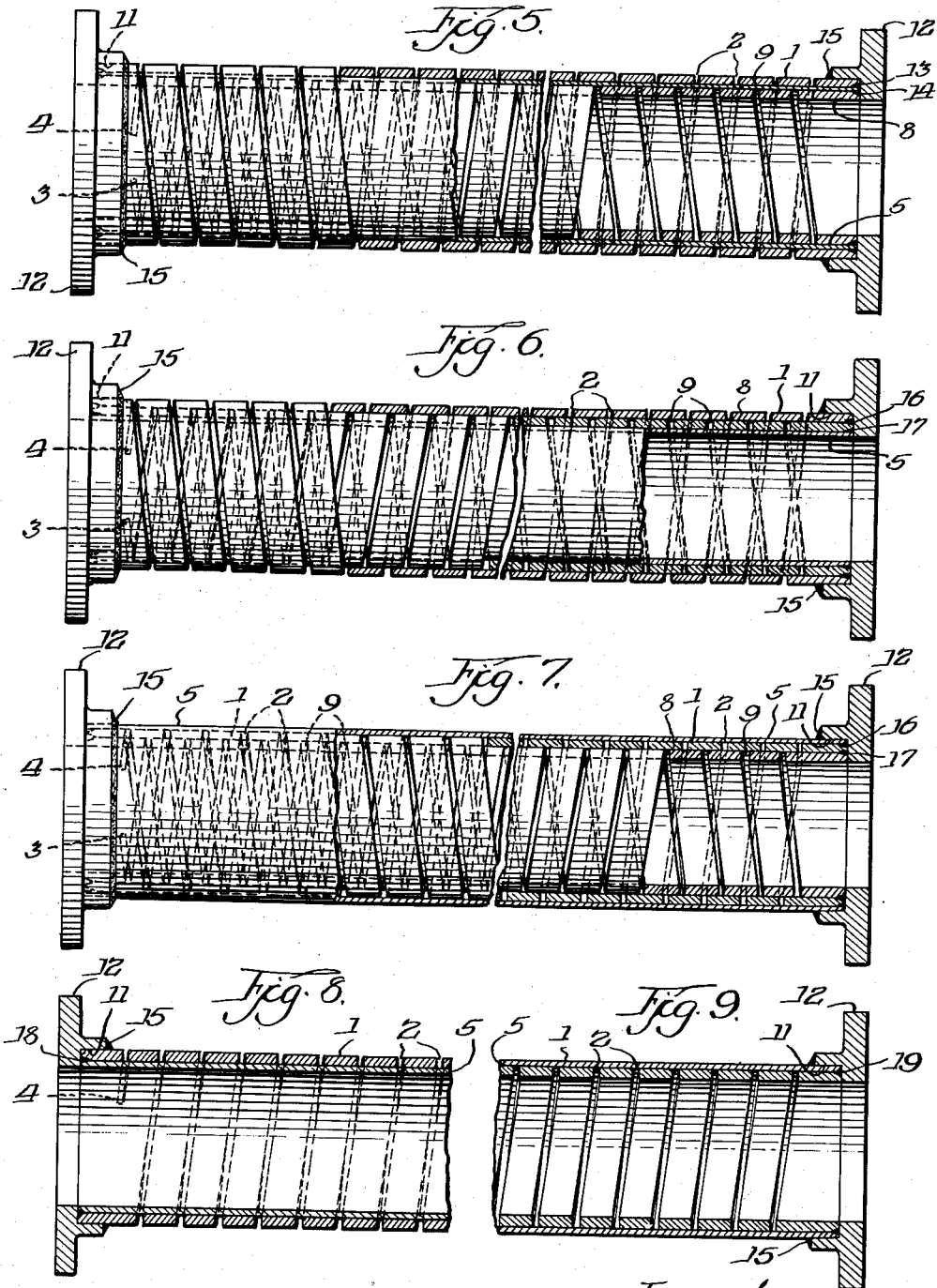

3,086,556
FLEXIBLE METAL PIPE
Jerome J. Kanter, Palos Park, Ill., assignor to Crane Co., Chicago, Ill., a corporation of Illinois
Filed June 10, 1960, Ser. No. 35,365
5 Claims. (Cl. 138—131)

This invention relates generally to a flexible pipe, and, more particularly, it is concerned with flexible metal pipe. At the outset, in order to acquire a better appreciation of the background of this invention, it should be understood that under service conditions in pipe lines involving relatively high temperatures and pressures, and particularly involving high temperatures, the matter of overcoming stresses arising from expansion and contraction in a pipe line constitutes a difficult and very important problem. It will, of course, be understood that as temperatures vary, the stresses traceable to such expansion and contraction exert a powerful influence in the proper functioning of the pipe line. Over the years, many forms of flexible pipe, bends and expansion joints have been tried, but nearly all have been subject to objectionable irregularities in performance, extraordinary expense, either in the manufacture thereof, replacement, or upkeep.

It is therefore one of the more important objects of this invention to provide for an effective and more flexible pipe construction in which the problems above referred to are easily overcome, while, at the same time, permitting a high efficiency in performance.

It will be understood that another important object of the flexible metal element of this invention is to provide a pipe assembly capable of overcoming vibrational modes and also to reduce noise attenuations.

It is accordingly one of the prime objects of this invention to provide for a multiple walled flexible pipe in which said pipe is constructed on a spiral scheme or helical spring plan.

In the latter connection in describing this invention, let it be assumed that length of seamless pipe is machined or otherwise formed with a narrow slit extending continuously spirally through the wall of the pipe, the slit starting at a suitable predetermined distance short of the end of the pipe and terminating at a prescribed distance from the other end of the length of pipe. It has been found that two telescoping tubes can easily and conveniently be so prepared with their spiral grooves or slits being pitched so as to run either in parallel or in opposite directions and with such telescoping assembly of the inner and outer pipes completed a third continuous walled tube is added and mounted so as to be telescoped or sandwiched between the inner and outer spiral tubes.

It is apparent that the sandwiched tube will thus serve to seal the vents or openings at the intersections at the oppositely pitched spiral grooves, and further that such an assembly will provide greater flexibility against lateral movement than a similar length of solid pipe of equivalent wall thickness.

It will, of course, be appreciated that the choice of the materials selected, the machining and the proportioning of these sandwiched members, preferably imperforate, except for the spiral slits or openings may be such that fluid tightness of the line is effected by virtue of one member being imperforate, the perforate or spirally slitted member providing the reinforcing effect for the imperforate member.

It has been found that the spring or resilient effect of such a construction tends to be restrained by the internal pressure, realizing that a helical spring extends primarily by twisting. It has further been discovered that tension or pull exerted upon a twisted strip tends to untwist it. Therefore, the hoop stress generated by pressure in the assembling does have an inhibiting effect upon the normal spring tension due to the longitudinal pressure stress. Perhaps, the latter observation is brought out more clearly in the realization that if, for example, a horizontal pointer were attached to a vertical spring made to rotate by loading the spring, the angle through which it turns might be used to measure the load upon the spring, particularly under such circumstances when the said spring load is not excessive.

It has been found that a more sensitive contrivance lies in the twisted strip wherein a very thin, narrow rectangular strip of metal is given a permanent twist about its longitudinal middle line. When the strip is subjected to longitudinal tension, the pointer rotates through a considerable angle and certain experimenters have succeeded in constructing a theory of the action of the strip, according to which it is regarded as a strip of plating in the form of a helicoid, which after the extension of the middle line becomes a portion of a slightly different helicoid. On account of the thickness of the strip, the change of curvature of the surface is considerable, even when the extension is small and the pointer turns with the generation of the helicoid.

Graphically considering the foregoing by means of a formula, if $b$ stands for the breadth and $t$ for the thickness and $T$ for the permanent twist, the approximate formula for the angle $A$ through which the strip is untwisted on the application of the load $W$, it was found to be as per the following:

$$A = \frac{WbT(1+P)}{2Et^3\left(\dfrac{1+(1+P)b^4T^2}{30t^2}\right)}$$

In the foregoing formula, $E$ equals Young's modulus of elasticity and $P$ equals Poisson's ratio. It will be understood that the quantity $bT$, which occurs in the above formula, is the total twist in a length of the strip equal to its breadth, and this will generally be very small; if it is small and of the same order as $t/b$, or of a higher order, the formula becomes $$A = \frac{\frac{1}{2}WbT(1+P)}{Et^3}$$

with sufficient approximation, and this result is in agreement with the observations of the behavior of such strips.

It has also been found that an additional restraining effect upon normal spring extension in such construction would be through the interference of the opposite twists of the oppositely pitched helices.

Although the type of configuration hereinabove referred to might provide considerable lateral flexibility when longitudinal displacements are to be provided for double helices of the same pitch direction, both internal and external, may be preferable. In such arrangement, the thin pressure retaining tubular imperforate member retained or sandwiched between the helices is made of a highly elastic material. That is to say, it would have a high elastic limit for which the column effect would be reduced by the retaining helices, making available an elastic range from the tension to the compression elastic limits. Thus, materials not suitable to the forming of "convolutions" constrictions become practical in the helically retained concept of this invention.

It should be further understood that the reasoning behind the introduction of the effect hereinabove referred to and its formula is to show that the "hoop-stress" strain will cause the "untwisting" of the helices and therefore tend to restrain the longitudinal extension component.

As will herein after become more readily apparent, the normal pipe terminations of the helices would become the weld sealing points for the sandwiched thin elastic member and by interference fit assembly. The end stresses of this member could be borne frictionally, relieving the seal weld of stress and high stress concentrations as are incurred at the terminations, usually of bellows or convolution constrictions, and the like.

Further, so as to realize to the fullest extent the stabilizing effect of the retaining helices, their abutting faces might under certain conditions be made slightly convex thereby to establish a helical line of contact with the elastic pressure member and still preserving an effective provision against blow-out or ruptures of the thin pressure members.

It is of course appreciated that in the selection of the metallic materials for the relatively thin wall tubing, materials might be provided with up to a three percent (3%) elastic variation of the over-all length of such a construction in ranging from the extreme tension to the extreme compression limits. While the thin walled tubing is preferably extremely thin, it is capable of carrying high stresses, say, of a hard rolled stainless steel of the order of 100,000 pounds per square inch elastic limit.

Other objects and advantages will become more readily apparent upon proceeding with a description of the invention in its various aspects as set forth in connection with the following drawings, in which:

FIG. 1 is a longitudinal sectional assembly view of a preferred form of my invention;

FIG. 2 is a sectional view taken on the line 2—2 of FIG. 1;

FIGS. 3, 4, 5, 6, 7, 8, and 9 are modified forms of the invention.

Referring now to FIG. 1, illustrated in substantially diagrammatic form, an outer pipe member generally designated 1 and preferably of a straight length is provided with the continuous slits 2 extending spirally from a location substantially near the end of the outer pipe and continuing from one end to the other, starting at the right hand end of the figure as indicated and terminating as indicated at 4 just short of the end of the pipe or tube. On the inside of the outer tubing 1, a relatively highly elastic thin tube 5 is mounted of substantially the same length as the outer tubing 1, the tubing 5 being relatively snugly received as indicated on the inner peripheral surface 6 of the spirally slitted outer tube 1, thereby in effect extending across the transversely extending spiral slits 2 for the full length of such spiral slitting.

In relatively snug fitting relation to the surface 7 of the thin tubing 5, a second spirally slitted and smaller tube 8 is mounted therein, being slitted spirally starting and terminating at 3 in the same manner as described in connection with outer tubing 1 with the slits 9, as shown. However, it is important to note here that preferably the spirally extending slits of the inner tubing 8 are so arranged that they are out of phase with the spirally extending slits 2 of the outer tubing 1 and thus overlap the outer slits to thereby support the inner surface 7 of the thin imperforate tubing 5 as shown. It will be appreciated that the outer tubing 1 and the inner tubing 8 are considerably thicker in metal thickness than the thin or membrane tubing 5 and are preferably of a material not necessarily so highly elastic as the member 5.

The ends of the tubes 1, 5, and 8 for purpose of connection to a pipe line are fitted within the bore 11 of the end flange 12, being suitably welded annularly thereto as indicated at their inner and outer peripheries at 13 and 14 respectively. For purpose of further supplementing the inner weld seals, an additional annular weld may be applied to the flange and outer pipe as at 15.

As shown more clearly in FIG. 2, the end flanges 12 are provided with the usual bolt holes 20 for attachment to a complementary flange to constitute the means for forming a pressure tight joint with the pipe line (not shown).

In cutting the respective spiral slits shown, this may be done relatively easily by a cutting wheel of uniform thickness as indicated so as to make the slits of the width desired and uniform pitch or spacing, or a tapered edge wheel may be used in which on the inner periphery of the tubes 1 and 8 there may be formed a substantially line bearing afforded by the vent edges left by the tapered edge cutting wheel.

Of course, many modifications may be used. As set forth merely as examples of such other embodiments, the description hereinafter given should be so construed.

Referring to FIG. 3, the construction and assembly is substantially the same as that described in connection with FIGS. 1 and 2, except that in this modification in relation to the inner and outer spirally slitted tubes, it is to be noted that the thin membrane tubing is telescopically inserted and is snugly positioned on the inside wall surface of the inner tubing 8 instead of being sandwiched between the slitted tubes 1 and 8 as shown in FIG. 1. It will also be noted that similarly in this construction the spirally extending slits 9 of the inner tubing 8 are cut through the said inner tubing 180 degrees out of phase with the spiral through grooves 2 in the outer pipe, thus providing the desired overlapping and support of the respective spiral extending surfaces of the slit areas forming the flat strip-like coils of the respective inner and outer pipe members 1 and 8. In all other respects, the construction is similar to that described in FIG. 1, the fluid tight joinder with the flanges 12 being accomplished by means of the annular weld connections at 16 and 17. The advantages and benefits flowing from the construction described hereinabove are obviously applicable to the construction described in connection with FIG. 3.

In FIG. 4, showing another modification, the thin membrane cylindrical member or tubing 5 is positioned snugly around the outside of the thicker spiral slitted pipes 1 and 8. In this case, of course, it will be appreciated that the outside diameter of the thin tubing 5 is made sufficiently large so as to fit snugly within the flange bore 11 as shown, and the inner slitted telescoped pipe members 1 and 8 in this construction are provided with the overlapping surfaces in the same manner as described in the previous figures.

In some modified constructions, it may be desirable, without defeating or impairing the flexibility benefits, to provide for the spiral slits of the respective inner and outer tubes to be reversed in pitch or annular slope relative to each other. In this connection, attention is directed to the modified form shown in FIG. 5, which in all respects is identical to the construction of FIG. 1, except that in FIG. 5, the annular slits 9 of the inner tubing 8 are cut or otherwise formed so as to extend in a direction opposite to that of the spirally extending slits 2 of the outer tube 1. The thin membrane tubing 5 is telescopically sandwiched between the outer and inner tubing members 1 and 8 respectively in the same manner as described in connection with FIG. 1. The inner slotted spirals provide for the space overlapping and support of the outer spiraled cut-away portions of the tubing 1 in the same manner as previously described. In this construction, it will be apparent that such inner support for the thin membrane tubing 5 is substantially strengthened or reinforced by the oppositely pitched slitted portions of the tubing 8, thereby to provide the added support advantages for the membrane member above described.

In the modified construction shown in FIG. 5, the attachments to the flanges 12 are made in the same manner as described in connection with FIG. 1.

FIG. 6 is a modification of FIG. 5, in that the spiral portions of the inner and outer tubes 1 and 8 extend so as to be oppositely pitched as described in connection with the previous figure, but in this construction, the membrane or thin tubing 5 is telescopically mounted on the inside of the inner tubing 8 in the same manner as described in connection with FIG. 3, and the means of attachment to the flanges 12 follow the same arrangement as indicated at 16 and 17 in both FIGS. 3 and 6.

The modification shown in FIG. 7 follows the pattern described in connection with FIG. 4, in that the membrane or relatively thin tubing 5 is made of a diameter sufficient to fit snugly within the bore 11 of the flange 12 and in this construction the spirally slitted portions 2 and 9 of tubing 1 and 8 respectively are oppositely pitched to extend in reverse directions in much the same manner as described in connection with FIG. 5.

The modified forms of both FIGS. 8 and 9 show a single slitted pipe and single membrane arrangement.

The modification shown in FIG. 8 shows the cylindrical membrane or tubing 5 disposed within the outer tubing 1, the latter being spirally slit commencing at 4 to snugly enclose the tubing 5, the latter being attached to the outer tubing 1 and also the flanges 12 by the annular V-weld 18 as shown. It will be apparent that under certain conditions this type of construction may be useful in providing the desired flexibility in the pipe line in response to changes in temperatures and pressure conditions.

FIG. 9 follows the pattern of FIG. 8 in much the same manner as previously described in connection with that figure, except that in the instant modification, the membrane tubing 5 is positioned on the outside and made with a sufficiently large diameter to fit snugly within the bore 11 of the flanges 12, being attached as at 19 to the said flange. In this case, the slotted spiral configuration follows the pattern as described in connection with the previous figure.

It will be understood that where reference is made above to weld connections between the tubes or pipes and the flanges 12, other forms of fluid-tight connections may be employed within the spirit of the invention.

It will also be appreciated that while a number of modifications have been shown and described, these examples are for purpose of illustration only and not of limitation, and therefore the scope of the invention should be measured by the claims as appended hereto.

I claim:
1. In flexible metal pipe means, the combination of inner and outer tubular members, the said members being slotted spirally, and an imperforate tubular member sandwiched between said inner and outer tubular members.

2. In flexible metal pipe means, the combination of inner and outer tubular members, the said members being slotted spirally and uniformly for substantially their entire length, and an imperforate tubular member sandwiched between said inner and outer tubular members, the said sandwiched member being of thinner wall thickness than the inner and outer members.

3. In flexible metal pipe means, the combination of inner and outer tubular members, the said members being slotted spirally, and an imperforate tubular member sandwiched between said inner and outer tubular members, the slits in one member being out of phase with the slits of the other member whereby to overlap.

4. In flexible metal pipe means, the combination of inner and outer tubular members, the said members being slotted spirally in oppositely pitched directions, and a thin imperforate tubular member of the same length as the spirally slotted members sandwiched between said inner and outer tubular members.

5. In flexible metal pipe means, the combination of inner and outer nested tubular members, the said members being slotted spirally, and an imperforate tubular member of stainless steel sandwiched between said inner and outer tubular members having an elastic limit substantially of the order of 100,000 pounds per square inch.

References Cited in the file of this patent
UNITED STATES PATENTS

| | | |
|---|---|---|
| 134,654 | Downs | Jan. 7, 1873 |
| 591,092 | Brooks | Oct. 5, 1897 |
| 753,230 | Calcutt | Mar. 1, 1904 |
| 755,204 | Witzenmann | Mar. 22, 1904 |
| 779,374 | Phillips | Jan. 3, 1905 |
| 1,153,724 | Stocker | Sept. 14, 1915 |
| 1,484,575 | Shulin | Feb. 19, 1924 |
| 1,586,750 | Joline | June 1, 1926 |
| 1,779,592 | Goodall | Oct. 28, 1930 |
| 2,558,763 | Lee | July 3, 1951 |
| 2,649,778 | Buffet | Aug. 25, 1953 |
| 2,706,494 | Morse | Apr. 19, 1955 |

FOREIGN PATENTS

| | | |
|---|---|---|
| 949,810 | Great Britain | Sept. 1, 1910 |
| 84,798 | Switzerland | Apr. 2, 1920 |
| 261,633 | Italy | Dec. 6, 1928 |